April 16, 1963
R. J. CARROZZA ETAL
3,086,100
SHEET HANDLING APPARATUS
Filed Nov. 9, 1961
4 Sheets-Sheet 1
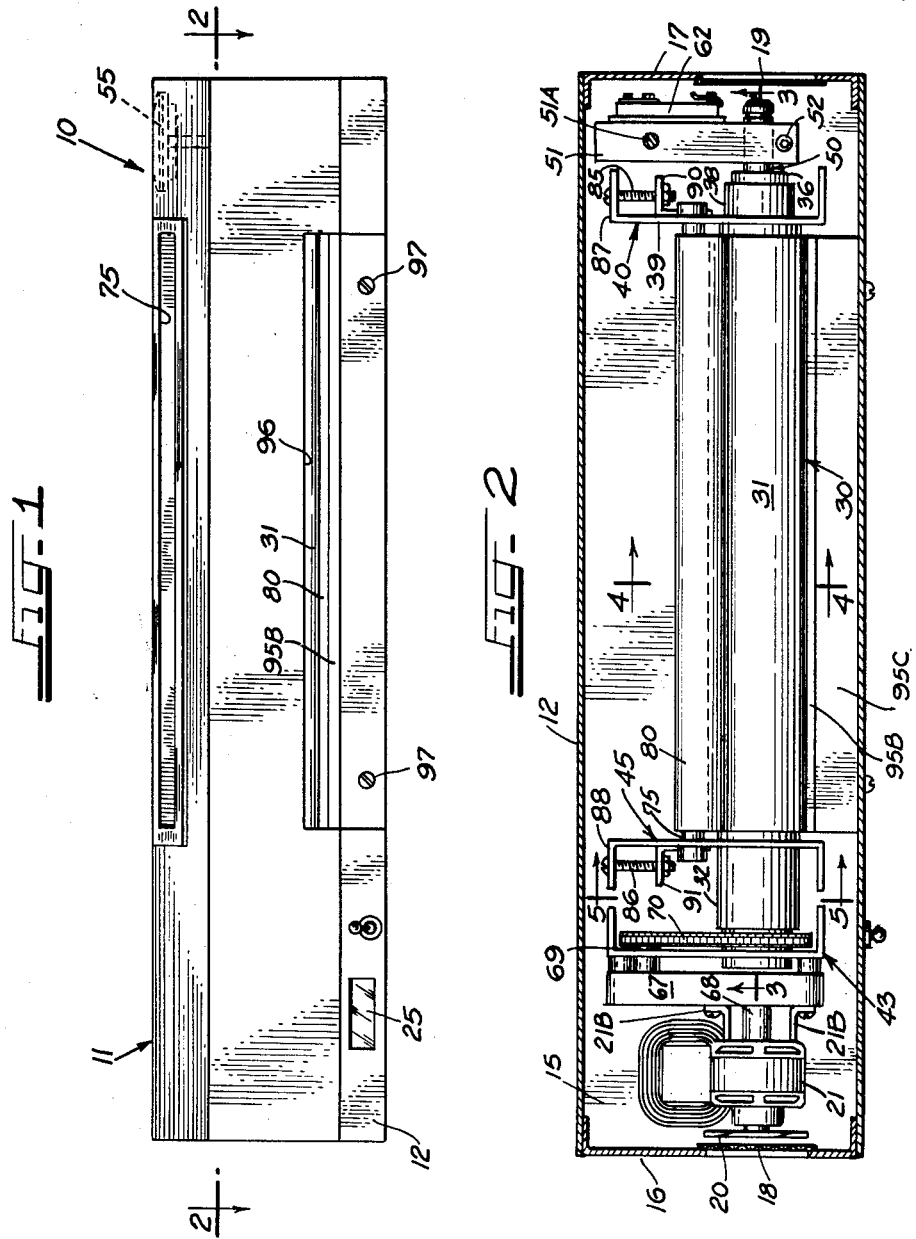
INVENTORS.
ROY J. CARROZZA
AUGUST W. GEMBOL
BY
Wallace, Kinzer & Dorn
ATT'YS.

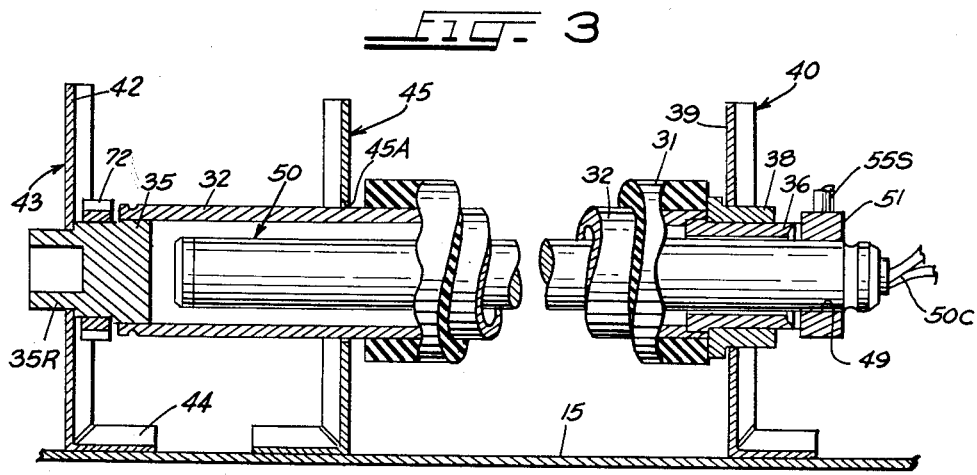
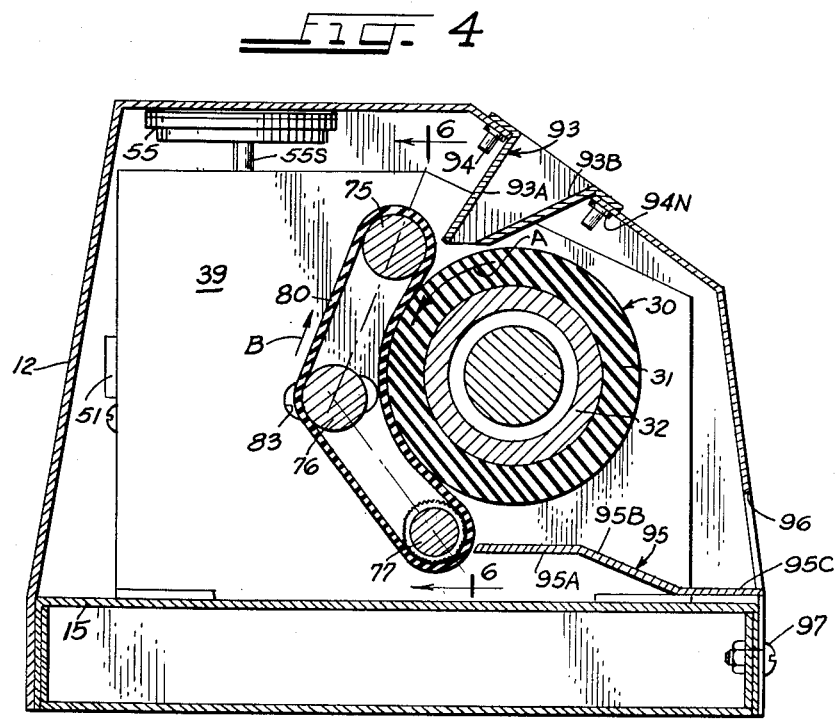

April 16, 1963 R. J. CARROZZA ETAL 3,086,100
SHEET HANDLING APPARATUS
Filed Nov. 9, 1961 4 Sheets-Sheet 3
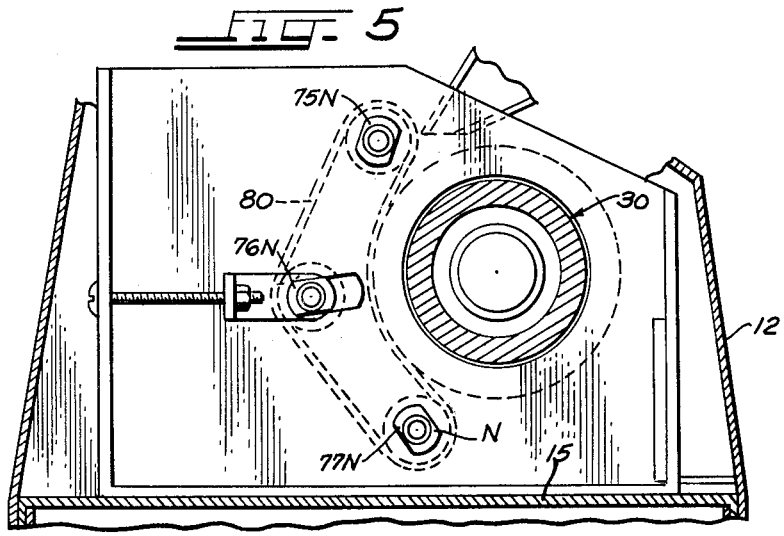
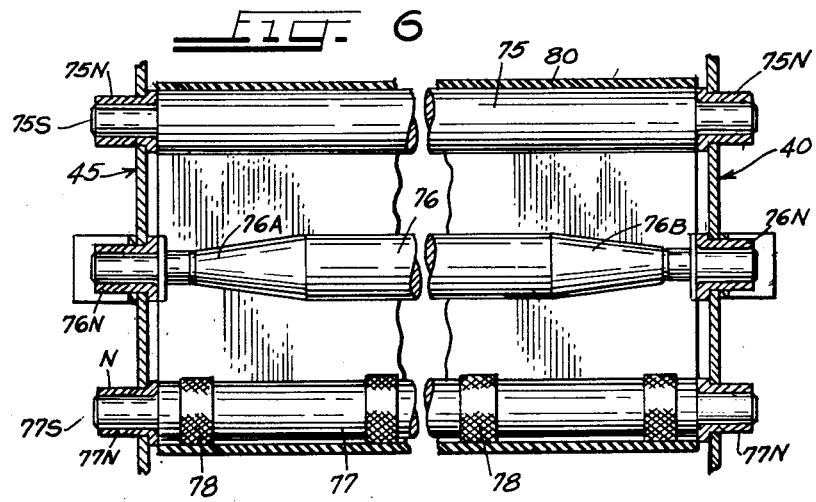
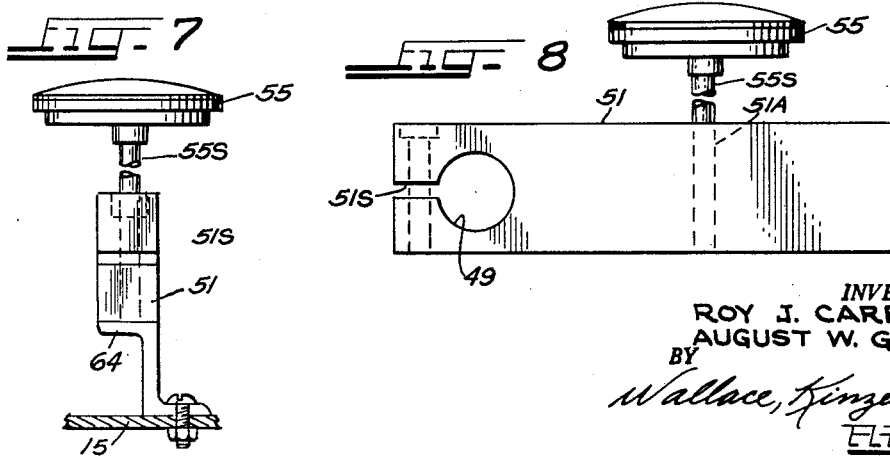
INVENTORS.
ROY J. CARROZZA
AUGUST W. GEMBOL
BY
Wallace, Kinzert Rose
ATTYS.

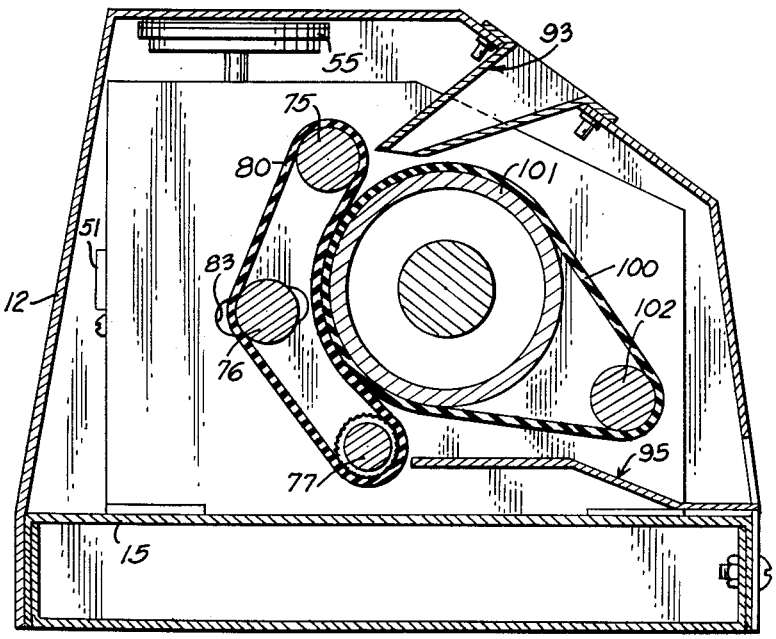

United States Patent Office 3,086,100
Patented Apr. 16, 1963

3,086,100
SHEET HANDLING APPARATUS
Roy J. Carrozza, Chicago, and August W. Gembol, Elmwood Park, Ill., assignors to Logan Metal Products, Inc., Chicago, Ill., a corporation of Illinois
Filed Nov. 9, 1961, Ser. No. 151,342
3 Claims. (Cl. 219—19)

This invention relates to a machine for processing photographic prints and like operations, and in particular to a machine for developing photographic negatives on the heat principle.

Film used for special photographic work such as microfilms and the like is available of such composition for development on the basis of heat of a predetermined order applied thereto. The present machine is constructed to produce prints using the heat principle, and the primary object of the present invention is to so construct the machine as to enable negatives of this kind to be expeditiously handled and printed. In particular, and such constitutes a specific object of the present invention, the machine is constructed to include a main roller having heating means associated therewith, and the negative to be printed is pressed against a surface that moves therewith, to travel in contact therewith, by an adjustable feed band, the negative being guided thereto and out of the machine by guides that are so related to the main housing as to enable the machine to be easily disassembled.

The foregoing is merely one example of the use to which the present machine can be put. It can be used for laminating sheets, for drying sheets and for other kindred purposes.

Other objects of the present invention are to afford a compact machine of the kind involved, to relate guide rollers of a particular kind to the aforesaid band, and to construct such a machine from relatively few and inexpensive parts arranged in a neat and compact relationship.

Other and further objects of the present invention will be apparent from the following description and claims and are illustrated in the accompanying drawings which, by way of illustration, show a preferred embodiment of the present invention and the principle thereof and what is now considered to be the best mode contemplated for applying that principle. Other embodiments of the invention embodying the same or equivalent principles may be made as desired by those skilled in the art without departing from the present invention and the purview of the appended claims.

In the drawings:

FIG. 1 is a front elevation of the exterior of a machine constructed in accordance with the present invention;

FIG. 2 is a sectional view of the machine taken substantially on the line 2—2 of FIG. 1 and showing the interior parts;

FIG. 3 is a sectional view on an enlarged scale and partly broken away, taken substantially on the line 3—3 of FIG. 2 and showing details of the main roller and associated parts;

FIGS. 4 and 5 are sectional views, on an enlarged scale, taken substantially on the lines 4—4 and 5—5 of FIG. 2;

FIG. 6 is a sectional view taken substantially on the line 6—6 of FIG. 4;

FIG. 7 is an end view of a block and bracket;

FIG. 8 is a view on the line 8—8 of FIG. 7; and

FIG. 9 is a sectional view illustrating a modified form of construction.

The machine 10, FIG. 1, of the present invention includes a main housing 11 including a cover plate 12 of stamped sheet metal shaped to neatly embrace and conceal the interior parts of the machine. The cover 12, as shown particularly in FIG. 4, is open at the bottom and is adapted to embrace a base 15 on which the interior parts are supported as will be described in detail hereinafter.

The cover 12, as noted, and the base 15 are constructed from stamped sheet metal parts, and this is also true of end caps 16 and 17, FIG. 2, that are neatly fitted into the open ends of the stamping 12 and secured thereto by spot welding.

The end caps 16 and 17 have bent openings formed therein, and these are covered by screen cut-outs 18 and 19, contributing to effective venting of the interior of the machine by a fan 20 driven by a motor 21, FIG. 2. It may be noted in this connection that an off-on switch SW, FIG. 1, for the motor 21 is available at the front of the machine. A panel glass 25 at the front of the machine is illuminated by a lamp that lights when the switch SW is closed.

The main roller 30 of the machine is supported for rotation in spaced relation above the base 15. This roller comprises an outer sleeve of heat-resistant rubber 31 and an aluminum sleeve or inner core 32. The rubber sleeve is secured to the core 32 for rotation therewith.

A bushing in the form of a solid plug 35, FIG. 3, is pressed into one end of the sleeve 32 and is secured thereto. A collar 36 is pressed into the opposite end of the sleeve 32. A bushing 38, FIG. 3, is pressed onto the outer surface of the collar 36, and this bushing is disposed for rotation in an opening in the upstanding leg 39 of a bracket 40 that is secured by screws to the base 15 to thereby serve as a support for one end of the main roller 30.

The end of the bushing 35 opposite that disposed in the sleeve 32 is reduced at 35R, FIG. 3, and the reduced end thereof is disposed for rotation in an opening in the upstanding leg 42 of bracket 43 having the lower horizontal leg 44 thereof secured to the base 15. Thus, the brackets 40 and 43 support the roller 30 for rotation.

It may be noted that an intermediate bracket 45 is afforded for a purpose to be explained hereinafter, and this bracket is formed with an enlarged opening 45A, enlarged in comparison to the sleeve 32, to enable the latter to turn freely therein.

The roller 30, and in particular the rubber sleeve thereon, is heated by an elongated electrical resistance cartridge unit 50 that is inserted freely through the bore of the collar 36. The heater unit is inserted at one end in an opening 49 of a metallic heat-conductive block 51. The end of the block 51 in which the heater element is disposed is split, at 51S, as shown in FIGS. 7 and 8, to afford bifurcated arms which clamp and support the end of the heater unit in the opening 49, and the clamping action is maintained by a screw 52, FIG. 2, which will flex the bifurcations when tightened. The heater 50 is effective to heat the block 51.

The resistance element 50 is of a known construction, heated by current supplied through a cord 50C. The wiring details are unimportant, but it may be noted that the connections are preferably such that current is supplied to the element 50 concurrently with starting of the motor 21 when the switch SW is closed which, it will be recalled, is also manifest in illumination of the panel 25.

Advantageously, a thermometer dial 55, FIGS. 1, 7 and 8, is disposed neatly in a recess in the top of the housing 12, FIG. 1, and the stem 55S of the thermometer is adapted to fit in an aperture 51A formed in the heat conductor block 51 to sense the temperature thereof. A thermostat switch 62 is secured to the block 51, being arranged operatively in the electrical circuit, and includes the usual thermostat switch contacts for sensing the temperature of block 51 and preset to assure the desired temperature condition.

The conductor block 51 and associated parts are supported above the base 15 by a bracket 64, FIGS. 7 and 8. The manner in which the roller 30 is supported has been described above and a positive drive is imparted thereto by the motor 21 when the latter is energized. To this end, the mounting brackets 21B of the motor, FIG. 2, are secured to one side of a gear reducing unit 67, and the reducing gears therein are driven by the motor shaft 68. The output of the gear reducer is imparted to a sprocket 69 which in turn drives a chain 70 that is played around a sprocket 72, FIG. 3, secured to the bushing 35 that is secured to the cylinder or sleeve 32. Consequenlty, when the motor 21 is energized, the main roller 30 is driven and rotates relative to the supporting brackets and the heater element above described.

The negative film to be developed, or sheet to be processed, as will be explained in more detail hereinafter, is advanced into a guide slot 75 at the front of the machine near the top. This film is to be held in contact with the exterior surface of the rubber sleeve 31 on the heater roller 30. To this end, a set of superimposed guide rollers including rollers 75, 76 and 77, FIG. 4, are arranged in an arc adjacent what amounts to the rear side of the main roller 30. An endless rubber belt 80, having a width corresponding to the axial dimension of the rollers 75, 76 and 77, is trained around the rollers 75, 76 and 77, and roller 76, as will be explained hereinafter, in its intermediate position as shown in FIG. 4, is arranged for movement toward and away from the main roller 30 to vary the tension on the belt 80. In any event, the relationship is such that the belt 80 contacts the back side of the main roller 30 throughout an appreciable arc, and hence is effective to firmly press the negative to be developed thereagainst for a time period.

The guide rollers described above are provided with stubs 75S, 76S and 77S at the opposite ends thereof as shown in FIG. 6, and these are supported rotatably in bearings 75N, 76N and 77N that are provided with external flat surfaces press-fitted in openings in the brackets 40 and 45 to be secured therein.

The lowermost guide roller 77 is provided with knurled collars 78 to asssure positive travel of the belt 80, and the intermediate roller 76 has relatively long tapered end portions 76A and 76B which assure that the belt 80 remains centered and does not bind on the inner faces of the support brackets.

The machine in the present instance is so constructed that tension on the belt or band 80 can be adjusted. To this end, the openings in the brackets which support the bearings for the intermediate roller are elongated at 83, FIG. 4. Relatively long adjustment screws 85 and 86, FIG. 2, are extended inwardly from vertical flanges 87 and 88 provided at the rear of the brackets 40 and 45, and the ends of these screws opposite the heads are disposed in openings of related adjustment brackets 90 and 91 which in turn embrace the ends of the stubs on the roller 76 that projects outward of the vertical flanges in the brackets 40 and 45. By turning the nuts on the screws 85 and 86 in or out as the case may be, the belt 80 may be tensioned or slackened off as required.

It will be realized that the main roller when rotating is effective to drive the band in the direction indicated by the arrows A and B in FIG. 4, and the extent of travel of the band 80 in contact with the rubber surface of the roller 30, in conjunction with the speed relationships involved, determines the time of contact of the film to be developed with the heated surface of the roller.

The film to be developed, or sheet or sheets to be processed, is guided into the top entrance bight between the band 80 and the roller 30 by a guide in the form of a stamping 93 that includes plates 93A and 93B, FIG. 4, which afford the entrance slot 75 noted above in connection with FIG. 1. These plates, as shown in FIG. 4, converge in affording a guide throat that points in the direction of the bight between the band 80 and the roller 30, and consequently, an accurate guide for the film to be developed is afforded. The stamping 93 is removably secured to the cover 12 by means including threaded studs 94 secured to the stamping 93 to fit into openings in the cover 12. Nuts 94N secure the studs to the cover.

In like manner, the film after development (or sheet after processing) passes from the bottom of the roller 30 and is directed on to a guide in the form of another stamping 95 shaped to afford a flat ledge 95A onto which the developed film first passes as it leaves the exit bight between the band 80 and the roller 30. The ledge 95A merges into a downwardly sloped surface 95B and from thence to a horizontal surface 95C immediately adjacent the front of the machine and whereat the developed film can be grasped by extending the fingers into a slot 96 adjacent the bottom of the machine. The stamping which affords the exit guide is secured to the base 15 as by screws 97.

When the machine is to be operated, the switch is flipped on and the panel 25 will be illuminated. Eventually the thermometer will indicate that the operating temperature has been reached, and at this time the sheet to be processed by heat can be inserted into the top guide slot to be picked up by the guide or feed band 80 and pressed by the latter for a short period of time against the heated surface of roller 30 to produce a positive or print that is available, when printed, at the bottom slot 96. This operation is repeated for as many sheets as there are to be processed, and in this connection it will be appreciated that the machine can handle quite long sheets or negatives in strip form. In the event more or less heat is required, the thermostat switch can be altered to open the electrical circuit later or sooner as the case may be. The speed of the band 80 can be changed simply by substituting a different gear reduction unit 67.

An alternate arrangement is shown in FIG. 9 wherein a wide, endless band 100 of rubber or the like is wound around a driven support roller 101, that is heated, and a much smaller idler roller 102. The band 100 engages the band 80 and serves as a heated, movable back-up surface in the manner of the rubber surface 31 on the roller 30 above described, and in fact the band 101 drives the band 80 in the manner that the latter is driven by the roller 30. The construction of the machine exemplified by FIG. 9 is otherwise substantially the same as described above. Whether there be a rubber surfaced roller as 30 or a roller as 101 having a band trained therearound, the net effect is a heated, resilient back-up surface that rotates with the driven roller.

It will be seen from the foregoing that the machine of the present invention represents compact sheet processing apparatus wherein the guides can be easily separated from the cover and the base, and wherein the latter can be easily separated from one another. A back-up or pressure surface represented by the rotatable roller 30 or the rotatable band 100 is driven and heated in an advantageous manner using parts that enable temperature conditions to be easily sensed and indicated. Additionally, the feed band 80 is arranged for variant tensioning by a novel arrangement including adjustment screws and brackets in an inexpensive arrangement.

Hence, while we have illustrated and described a preferred embodiment of our invention, it is to be understood that this is capable of variation and modification, and we therefore do not wish to be limited to the precise details set forth, but desire to avail ourselves of such changes and alterations as fall within the purview of the following claims.

We claim:

1. A developing machine for photographic prints comprising a main roller to be heated and having heating means associated therewith including an elongated electrical resistance heater cartridge inserted removably as a unit into said main roller, said cartridge being supported in a metallic block for heating the same, a thermostat switch in thermal contact with said block to sense the temperature thereof and effective to control said heater cartridge, means to rotate the main roller, a plurality of guide rollers adjacent the main roller, a guide band trained around the guide rollers and effective to press against the main roller a photographic negative advanced into the bight between the main roller and the guide band, means to adjust one of said guide rollers thereby to vary the tension of the guide band, and a multiple part housing for the machine including a cover, a separate top guide formed from a stamping affixed to the cover and affording a guide throat directed toward the entrance bight between the main roll and the guide band, and a separate bottom guide formed from a stamping affixed to the cover and affording a guide ledge extending to the front of the machine from the exit bight between the main roll and the guide band.

2. A developing machine for photographic prints comprising a main roller to be heated and having heating means associated therewith including an elongated electrical resistance heater cartridge removably inserted into said main roller, said cartridge being supported in a metallic block for heating the same, a thermostat switch in thermal contact with said block to sense the temperature thereof and effective to control said heater cartridge, said main roller including an outer sleeve of heat resistant rubber and a supporting sleeve of heat conductive metal surrounding said cartridge, said main roller having bushings supported for rotation in brackets that are part of the machine, means to rotate the main roller including a drive motor and a drive connection between the motor and said main roller, a plurality of guide rollers adjacent the main roller and superimposed one above another, a guide band trained around the guide rollers and effective to press against the main roller a photographic negative advanced into the bight between the main roller and the guide band, other support brackets, one of said guide rollers being rotatably supported at the ends thereof in elongated slots provided in said other support brackets, screw means for shifting said roller relative to said slots toward and away from the main roller thereby to adjust the tension of the guide band, and a multiple part housing for the machine including a cover, a separate top guide formed from a stamping removably inserted into the cover and affording a guide throat directed toward the entrance bight between the main roller and the guide band, and a separate bottom guide in the form of a stamping removably related to the cover and affording a guide ledge extending to the front of the machine from the exit bight between the main roller and the guide band.

3. A developing machine for photographic prints according to claim 1, in which said main roller comprises a supporting sleeve of heat-conductive metal and an outer sleeve of heat-resistant rubber covering said metal sleeve throughout the area of engagement of said main roller with said guide band, said outer sleeve constituting an endless belt that extends away from said metal sleeve and around an idler roller disposed in spaced parallel axial alignment with said metal sleeve.

References Cited in the file of this patent
UNITED STATES PATENTS

| | | |
|---|---|---|
| 1,810,636 | Adler et al. | June 16, 1931 |
| 2,548,573 | Wampole et al. | Apr. 10, 1951 |
| 2,679,572 | Workman | May 25, 1954 |
| 2,924,163 | Jaffe et al. | Feb. 9, 1960 |
| 2,966,065 | Renner | Dec. 27, 1960 |
| 3,001,463 | Reick | Sept. 26, 1961 |
| 3,012,141 | Thomiszer | Dec. 5, 1961 |